Aug. 27, 1968  K. G. WOOD ETAL  3,398,809
AIR-CUSHIONED AND GROUND-ENGAGING VEHICLE
Filed Oct. 19, 1966  2 Sheets-Sheet 1
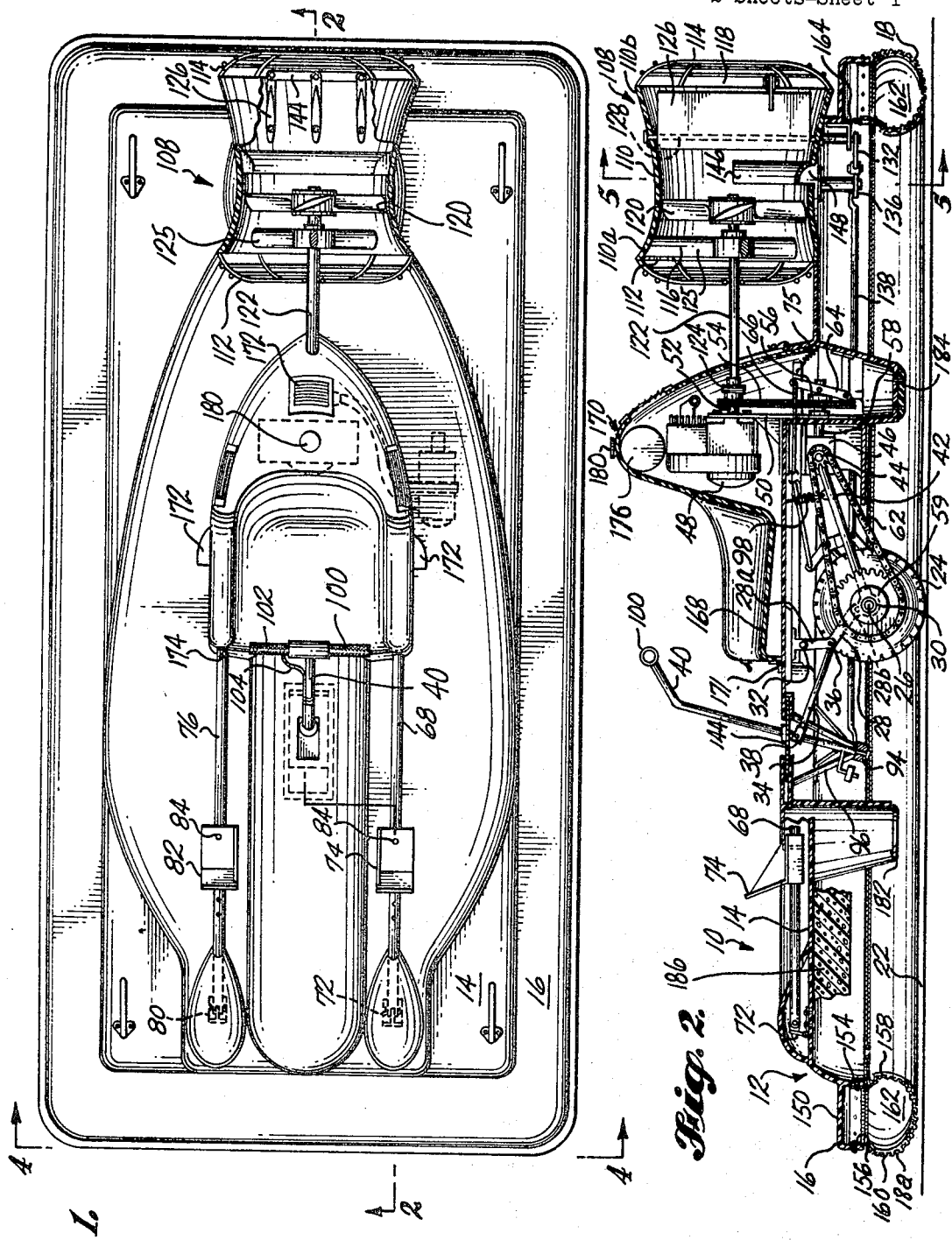
INVENTOR.
WALTER A. CROWLEY
BY KENNETH G. WOOD
Robert B Hughes
ATTORNEY

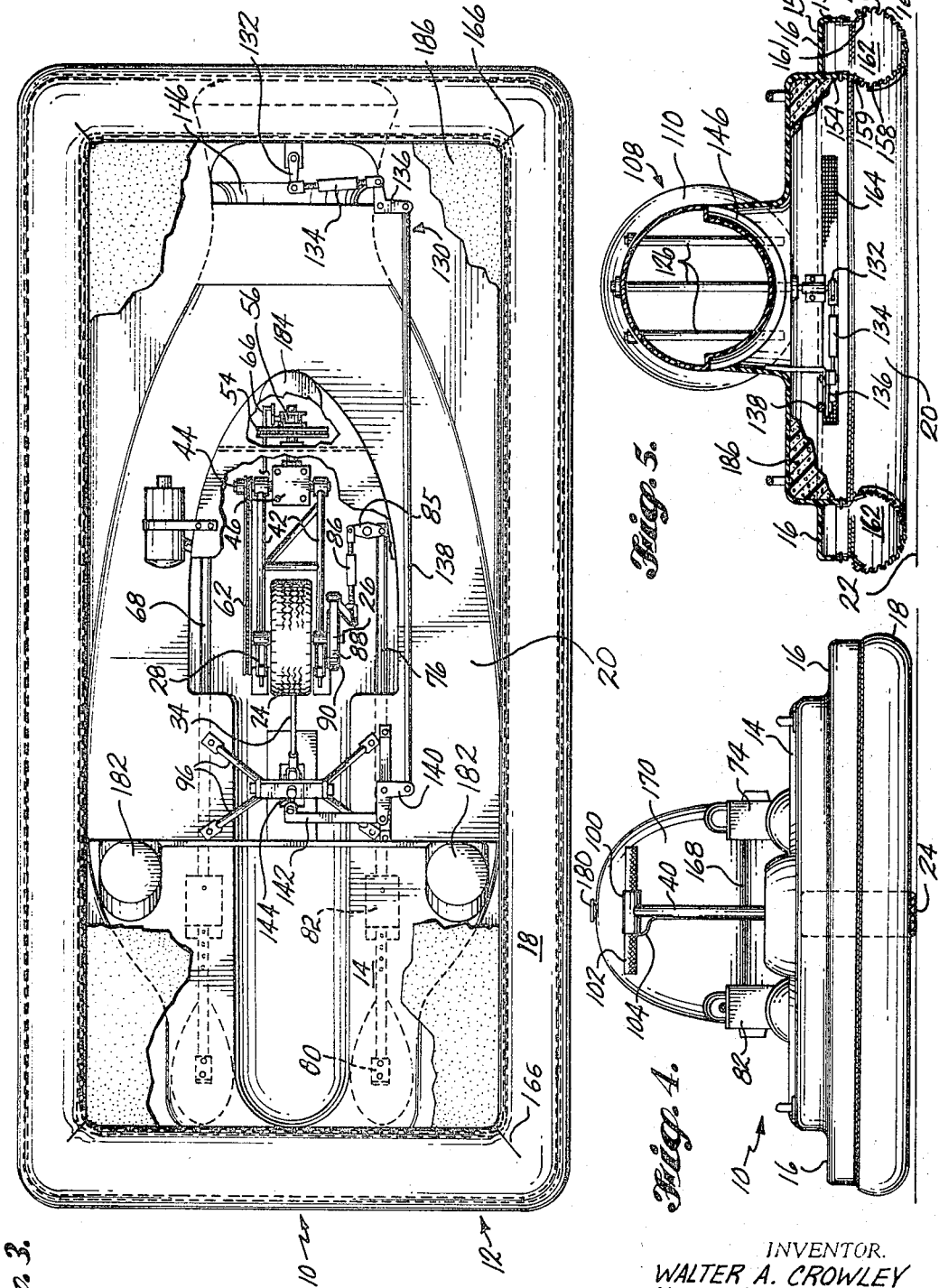

United States Patent Office 3,398,809
Patented Aug. 27, 1968

3,398,809
AIR-CUSHIONED AND GROUND-ENGAGING
VEHICLE
Kenneth G. Wood, 8025 44th SW., Seattle, Wash.
98116, and Walter A. Crowley, Seattle, Wash. (Lot
74, Belnor Mobile Home Park, 2041 S. 320th St.,
Federal Way, Wash. 98002)
Filed Oct. 19, 1966, Ser. No. 587,821
9 Claims. (Cl. 180—119)

ABSTRACT OF THE DISCLOSURE

The preferred embodiment of the present invention described herein comprises a vehicle body which forms a downwardly open plenum cavity which, when pressurized, lifts the vehicle from the ground surface in the well-known manner of a ground effects machine (i.e., G.E.M.). There is at the general center of gravity of the vehicle a ground wheel member which can be lowered to a ground-engaging position or raised to a retracted position. There is for the wheel member a power transmission, a clutch, and a brake. Further, the wheel is arranged to be freewheeling so that it can rotate along the ground surface with little internal friction. A fan is mounted at the rear of the vehicle to perform essentially three functions: (a) to blow air rearwardly to propel the vehicle, (b) to move air into the vehicle plenum cavity to pressurize the same, and (c) to pressurize a flexible skirt which extends about the entire perimeter of the vehicle and forms the peripheral portion of the plenum cavity. The vehicle is steered by vanes which can be moved to direct the propelling air stream in a desired direction. Power for the ground wheel member and the fan is supplied from a single motor.

While completely "airborne," the vehicle can travel at top speed. In this airborne condition, the ground wheel member can be lowered selectively to give lateral control (i.e., avoid "side slipping") with negligible loss of speed; or by lowering the wheel member and applying the brake, the vehicle can be slowed down or brought to an abrupt stop. When it is desired to accelerate quickly or climb a hill, the wheel member is lowered and driven under power. The steering vanes can be used without aid from the ground wheel member for steering the vehicle; but for more intricate maneuvering or more precise control, the ground wheel can be used in combination with the steering vanes. In fact, by dropping the wheel, applying the brake and turning the vanes, the vehicle can be turned completely around with the wheel location being a stationary pivot point. The control and power transmission apparatus and certain other features of the physical arrangement of the vehicle are believed also to be significant in the present invention and will be described hereinafter in some detail.

This invention relates to a combined air-cushioned and ground-engaging vehicle for travel over a ground surface.

*Background of the invention*

The prior art discloses many vehicles of the type which have one or more downwardly open plenum cavities which, when pressurized, lift the vehicle from the ground surface in a manner that the vehicle forms with the ground surface a perimetrical air escape gap around the periphery of the pressurized plenum cavity or cavities. Most often some aerodynamic means such as a propeller are used to propel the vehicle. Such a vehicle has various advantages over a conventional wheeled or tracked vehicle. For example, it will pass over swampy ground where a conventional ground vehicle would become bogged down. Also, since there is little if any frictional drag from the ground surface, the vehicle can cruise along under less power than would otherwise be needed.

However, this last characteristic of lack of frictional engagement with the ground surface presents certain problems in the control of the vehicle. For example, if an air-cushioned vehicle is airborne over slanted ground, there will be a force component which tends to cause the vehicle to "slide" down the slope. Also, there are problems in stopping the vehicle and in traveling around curves.

For these and other reasons, there have in the past been proposed various "combination" vehicles that not only can travel on the ground with wheels or tracks, but can travel while being lifted free of the ground by a cushion of air. Thus, the vehicle at one time functions as an air-cushioned vehicle or "ground effects machine" (G.E.M.) and at other times as a ground-engaging vehicle that travels, for instance, with wheels. While such prior art machines are operable and have certain advantages of versatility, there have usually been certain drawbacks. For example, with respect to the airborne operation of the vehicle, there has usually been a large weight penalty in having to lift the ground traveling equipment associated with the vehicle. Conversely, when such vehicles are traveling on wheels, the air-cushioning equipment must be positioned where it will not impede the ground traveling capability of the vehicle. The overall result has usually been that the total vehicle becomes less effective either as an air-cushioned vehicle or as a ground traveling vehicle.

Another prior art approach has been to provide some ground wheel engagement to obtain better steering or lateral control. U.S. Patents 3,216,518 and 3,245,712 disclose two such devices; but such machines have at best only limited value over conventional ground effects machines.

Thus, it may be stated as a general object of the present invention to provide a vehicle which combines in an especially advantageous manner desired characteristics of both an air-cushioned and a ground-traveling vehicle and certain other desired characteristics not now present in prior art vehicles so that the vehicle can travel in an airborne condition or in an aiborne and ground-engaging condition.

It is a further general object to provide such a vehicle which is highly versatile. That is to say, it can travel in a manner comparable to a conventional automobile in that it can stop; start; accelerate; turn; park; cruise under quite adequate control; and travel safely and effectively both up and down hills and on banked and unbanked curves. Also, it can maneuver in a manner that would be impossible for an automobile. (For example, it can turn completely around while remaining in the same location.) Further, it can travel essentially as a ground effects machine; and when doing so the ground wheel can be used very advantageously for control without detracting from the vehicle's effectiveness as a ground effects machine. And, of course, the vehicle can travel over a variety of surface conditions where other vehicles could not operate.

Finally, the vehicle of the present invention is able to accomplish this with a structure that is lightweight; inexpensive; functionally and structurally simple; and quite convenient to operate.

These and other objects and features of the invention will be more readily understood and appreciated from the following detailed description of the preferred embodiment thereof selected for purposes of illustration and shown in the accompanying drawings, in which:

FIGURE 1 is a top plan view of a vehicle constructed in accordance with the present invention;

FIGURE 2 is a longitudinal sectional view taken generally along line 2—2 of FIGURE 1;

FIGURE 3 is a bottom plan view of the vehicle;

FIGURE 4 is a front elevational view thereof taken at line 4—4 of FIGURE 1, and

FIGURE 5 is a transverse sectional view taken along line 5—5 of FIGURE 2.

FIGURES 1 through 5 illustate a vehicle actually constructed in accordance with the present invention. This particular vehicle is 9 feet long and 4½ feet wide and has a gross weight (i.e., total weight less the weight of the operator) of about 180 pounds.

The body of this vehicle is designated generally by numeral 10 and comprises a main frame portoin 12 made up of a generally flat rectangular platform 14 and a peripheral or rim structure 16 by which a flexible air-bearing peripheral skirt 18 is secured to the body 10. The frame portion 12 along with the skirt 18 defines a downwardly open plenum cavity 20, which, when pressurized, lifts the vehicle from the ground surface 22.

Positioned in this plenum cavity 20 below the body platform 14 and at the approximate center of the body 10 is a ground wheel member which, in the present preferred embodiment, comprises a single wheel 24 rotatably mounted on a transverse horizontal axle 26. So that the ground wheel 24 may be raised and lowered, there is provided a toggle linkage 28, comprising two upper and two lower arms 28a and 28b, respectively, fitting on opposite sides of the wheel 24. The axle 26 is journal mounted at 30 to the lower end of each of the lower arms 28b, while the upper end of each upper arm 28a is pivotally mounted to a bracket 32 fixedly connected to the body platform 14. To actuate this linkage 28 and thus raise and lower the wheel 24, there is a rod 34 connected by one end to a pivot pin 36 connected to the arms 28a and 28b at the juncture thereof, and by the other end by a swivelling crosspin 38 to a control stick 40 (to be described more particularly hereinafter). A pair of bracing arms 42 forming a yoke are also connected by journal mountings to the axle 26 and extend rearwardly where they are connected by journal mountings concentric with the output shaft 44 of a gear box 46 (also to be described more particularly hereinafter).

The vehicle is powered by an internal combustion engine 48 which in the constructed machine is a one-cylinder engine having a normal rating of ten horsepower. This engine 48 is mounted by brackets 50 above the body platform 14 moderately to the rear of the center of the vehicle, with its output shaft 52 extending rearwardly therefrom. This output shaft 52 is connected through a chain and sprocket drive 54 to a clutch mechanism 56 located immediately to the rear of the aforementioned gear box 46. The output side of the clutch 56 is connected to a drive input shaft 58 of the gear box 46, and the gear box output shaft 44 is connected by means of a chain and sprocket drive 62 to the wheel 24 so as to drive the same through an overrunning clutch 59 (e.g., an A-43-6 Curtiss-Wright overrunning clutch) so that the wheel 24 can rotate faster than the speed at which the engine 48 would drive the wheel 24.

To cause the clutch 56 to engage and disengage, there is provided a pivotally mounted clutch actuating lever 64 connected by a rod 66 to a longitudinally extending clutch control rod 68 mounted to the body 10 for limited forward and rear motion by a front pivot connection 72 and a rear pivot connection (not shown). Connected to the clutch rod 68 is an upstanding clutch pedal 74, which when pushed forward causes the clutch 56 to engage, and when released, is retracted by a spring 75 to move the rod 68 rearwardly to cause disengagement of the clutch 56.

To the right of the clutch control rod 68 is a brake control rod 76, which in a maner similar to the clutch control rod 68 is mounted for limited forward and rear motion by means of a front pivot arm connection 80 and a similar rear pivot connection (not shown), and is also provided with an upstanding brake pedal 82. For convenience of the operator, both the clutch pedal 74 and brake pedal 82 are connected to their respective rods 68 and 76 by means of a pin connection 84 so that the position of the pedals 74 and 82 can be changed by selecting the desired pin hole in the rods 68 and 76. The brake control rod 76 is connected through a pivotally mounted link 85 and an adjustable connecting rod 86 to a brake shoe 88 that is mounted around a brake drum 90 that is fixedly secured to the wheel axle 26. Thus, the brake assembly 88–90 is actuated by pressing the brake pedal 82 forward.

The aforementioned control stick 40 is located at the longitudinal center line of the vehicle body 10 slightly forward of the center thereof and extends upwardly from the vehicle platform 14. The lower end of this stick 40 is mounted in a journal member 94 so that the stick 40 can be rotated about its lengthwise axis, and the journal member 94 itself is in turn pivotally mounted to a support frame 96 (which is in turn connected to the body platform 14) to permit swing motion of the stick 40 about a transverse horizontal axis.

The aforementioned connection 38 of the rod 34 to the control stick 40 is located moderately above the location of the journal mounting 94 so that swinging the control stick 40 forward pulls the rod 34 forward to lift the wheel 24 upwardly into a retracted position. Conversely, drawing the control stick 40 rearwardly extends the toggle linkage 28 to force the wheel 24 downwardly to its ground-engaging position. A tension spring 98 is connected between the body platform 14 and the aforementioned support arms 42 so as to urge the wheel 24 upwardly into a retracted position with a force slightly greater than the weight of the wheel 24 and its associated assembly. Connected to the upper end of the control stick 40 is a T-bar or handle bar 100, by which an operator (i.e., driver) can manipulate the control stick 40. The throttle for the engine 48 is conveniently provided in a known manner by mounting to one branch of the handle bar 100 a turnable control handle 102 which is connected by suitable means (e.g., cable 104) to the throttle control of the engine 48. The control stick 40 also functions to steer the vehicle, this being accomplished by turning the stick either clockwise or counterclockwise about its lengthwise axis. The particular linkage by which this is accomplished will be described more particularly hereinafter.

Located at the rear of the vehicle above the platform 14 is a fan assembly, generally designated 108. This assembly 108 comprises a generally cylindrical shroud 110, the front and rear ends of which (110a and 110b, respectively), are open and flared outwardly to a moderate degree. Protective screens 112 and 114 are provided at, respectively, the front and rear openings 116 and 118 of the shroud 110. Located in the forward portion of the shroud 110 is a fan 120 which is mounted to a longitudinally disposed shaft 122 for rotation about a longitudinal axis so as to draw air in through the front opening 116 of the shroud 110 and blow this air out through the rear opening 118. This shaft 122 is connected directly to the drive shaft 52 of the motor 48 by means of a direct drive coupling 124, and is mounted in the shroud 110 by struts 125.

Located in the rear portion of the shroud 110 are a plurality (three, as shown herein) of vertically disposed, laterally spaced steering vanes 126, each of which is fixedly connected by its front edge to a respective vertical rod 128 journal mounted in the upper and lower portions of the shroud 110. The linkage by which the vanes 126 are operated is generally designated 130 and, as shown herein, comprises an arm 132 fixedly connected at one end to the lower end of the center rod 128 and pivotally connected at the other end to a transverse horizontal connecting rod 134. This rod 134 is connected through a bell crank 136 to the rear end of a longitudinally extending rod 138, whose front end is in turn connected through a second bell crank 140 to another transverse rod 142.

This rod 142 is in turn pivotally connected to one end of a transverse arm 144, the other end of which is fixedly connected to the lower end of the aforementioned control stick 40. Thus, turning the control stick 40 clockwise (as viewed from above) moves the rod 142 to the right; and this in turn moves the rod 134 to the left to rotate the vanes 126 counterclockwise so as to deflect the main airstream from the fan 120 to the right and thus turn the vehicle to the right. So that the three vanes 126 turn together, they are each pivotally connected at the rear end to a common transverse bar 144.

To pressurize the plenum cavity 20, the lower shroud portion immediately aft of the fan 120 and forward of the vanes 126 is formed as an arcuately shaped forwardly open intake duct 146. The forward opening 148 defined by this duct 146 captures the lower peripheral portion of the airstream from the fan 120 and deflects this downwardly through the duct 146 into the rear portion of the plenum cavity 20, so as to pressurize this cavity 20 and thus lift the vehicle 10 from the ground surface 22.

As previously indicated, there is a perimetrical skirt 18 which is also pressurized from the fan 120. This skirt 18 is mounted to the aforementioned rim structure 16 which extends entirely around the vehicle body 10. This rim structure 16 has the cross-sectional configuration of an inverted U, and thus comprises a horizontal web portion 150 which is joined to inner and outer depending flange portions 154 and 156, respectively.

The flexible, air-bearing skirt 18 is made of a flexible, lightweight, low friction, impermeable, yet durable, material (e.g., vinyl-impregnated nylon cloth) and extends entirely around the preiphery of the vehicle body 10. One side portion 158 of the skirt 18 is attached to the inner flange 154 by means of a nylon zipper 159, and the other side portion 160 is in like manner attached by zipper 161 to the outer flange 156 so that the skirt closes the downward open end of the rim structure 16 and forms with this structure 16 a peripheral pressure chamber 162 extending around the entire perimeter of the vehicle body 10. This zipper arrangement permits easy removal of the skirt for cleaning, repair or replacement. The width dimension of the skirt 18 is sufficiently large so that when this peripheral chamber 162 is pressurized, the skirt 18 expands downwardly to assume the cross-sectional configuration of a rounded U. That portion of the flange 154 located at the rear of the vehicle is formed with a screened opening 164 so that a portion of the air from the fan 120 which passes through the duct 146 into the plenum cavity 20 will pass through the screened opening 164 to pressurize the skirt pressure chamber 162. The screened opening 164 has three functions: (a) to allow the pressurized air from the fan 120 to inflate the flexible air-bearing skirt 18, (b) to permit air to flow in or out between the chamber 162 and the plenum cavity 20 so as to maintain equality of pressure therebetween, and (c) to permit the skirt 18 to serve as a reserve volume of air to maintain the plenum pressure when the machine travels over a rough area of the ground which would otherwise cause a momentarily excessive loss of air from the plenum cavity 20. The screen itself aids in keeping debris from entering the chamber 162 of the flexible skirt 18.

At each corner portion of the skirt 18, the inner wall of the skirt is formed with a reentrant fold or pleat 166. Thus, when the corner portion of this skirt 18 encounters an obstacle which may deflect the skirt 18 inwardly, the corner portion of the skirt 18 can fold inwardly about this pleat 166 and thus not cause any undesired stresses in the skirt 18. Likewise, this pleat 166 permits the skirt to deflect outwardly.

At the approximate center of the vehicle and above the platform 14 is a seat 168 for the operator of the vehicle. The back portion 170 of this seat 168 conveniently serves as a cover for the engine 48, and the seat 168 is hinge mounted at 171 to provide access to the engine 48. The seat 168 also contains louvers 172 to provide cooling air for the engine, an ignition switch 174 on the front of the right arm of the seat 168, and a fuel tank 176 mounted inside the top rear of the seat. The fuel tank has a fuel filler cap 180 extending through the top of the seat back 170 for easy access. The vehicle body 10 is provided with two front and one rear downwardly extending feet members 182 and 184, respectively, which reach a moderate distance below the lower edge of the rim structure 116. Thus, when the vehicle is in a non-operating condition (with the skirt 18 thus not being pressurized), the vehicle will rest on these feet 182 and 184 rather than on the rim sturcture 16. These "feet" have a one-half inch thick cap of tough urethane rubber, bonded and riveted to the lower surface to provide a good wear surface. Also, since this vehicle can travel over water, the frame 12 is provided with buoyant material (portions of which are shown at 186) at the front and rear portions thereof so that the vehicle will be able to float in the event the engine 48 is shut off while the vehicle is over water.

When the vehicle is in its non-operating condition, the control stick 40 will normally be forward with the wheel 24 in its retracted position so that the vehicle rests on its three feet 182 and 184. As soon as the motor 48 is started, the fan 120, being driven directly from the motor 48, begins to blow air through the shroud 110, with a portion of the airstream being deflected by the duct 146 into the plenum cavity 20. As this plenum cavity 20 becomes pressurized, the pressurized air in the cavity 20 flows through screened opening 164 into the peripheral skirt chamber 162 and inflates the skirt 18 to the generally rounded configuration shown in the accompanying drawings. (In the embodiment illustrated in these drawings, the lowermost portion of the skirt 18 will be about six inches below the lowermost portion of the rim structure 16.) Simultaneously with the inflation of the skirt 18, the pressure in the plenum cavity 20 will build up to the extent that the vehicle is lifted off the ground, with the air in the cavity 20 slipping out through the perimetrical gap defined by the skirt 18 and the ground surface 22 and replenishing air constantly being supplied from the fan 120 through the duct 146, so that the vehicle remains "airborne." As soon as the vehicle becomes airborne, the thrust created by the fan 120 will begin to carry the vehicle forward; and the vehicle will thus begin traveling over the ground surface in the well-known manner of a ground effects machine, with the operator steering the vehicle by turning the control stick 40 to turn the vanes 126 and thus deflect the propelling airstream laterally to the desired degree.

However, as the vehicle becomes airborne, if the driver desires to obtain more precise control of his vehicle, he can simultaneously push in his brake pedal 82 and pull back his control stick 40 to bring the wheel 24 down to its ground-engaging position and thus halt any forward movement of the vehicle. Then by turning the vanes 126, the driver can turn the vehicle completely around about the stationary location of the wheel 24. Also by gradually releasing the brake pedal 82 and pushing in the clutch pedal 76 to cause some rotation of the wheel 24, and by operating the steering vanes 126, the vehicle can proceed slowly in a very controllable manner.

For quick acceleration, the driver will pull the stick 40 back to drop the wheel 24 and also push in the clutch pedal 76 so that the wheel 24 is driven from the motor 48. As the vehicle accelerates forward, it will tend to tip rearwardly; but the rear foot 184 will bump against the ground surface 22 to prevent any excessive rearward tipping of the vehicle. The ground wheel 24 will also be used to climb a hill which is too steep for the propelling force of the fan 126 alone to power the vehicle up the hill.

When the vehicle is traveling solely as a ground effects machine at a relatively high cruising speed, the ground wheel 24 can be used as desired to control the vehicle. For example, by lowering the ground wheel 24 to its ground-engaging position and operating the brake pedal 82, the vehicle can be brought to an abrupt stop. In that case, the vehicle will tend to tip forward, with the front feet 182 bumping against the ground surface 22. Or if the driver wishes to gain greater control over the lateral motion of the vehicle (for example, in traveling over a slanted ground surface or in a crosswind, or when traveling around a curve), the wheel 24 can be lowered to its ground-engaging position. Since the wheel 24 is free-wheeling because of the overrunning clutch 59, there is only a small frictional force from the wheel 24; and this will not appreciably slow down the vehicle.

When the vehicle encounters an obstacle (e.g., a board lying in the street) the front skirt portion 18a, as it nears the obstacle, will tend to lift up moderately so as to pass over the obstacle. It can be theorized with reasonable justification that as this skirt portion comes closer to the obstacle, the air flow from the plenum cavity 20 beneath this skirt portion 18a is impeded so that there is a moderate build up of pressure beneath this skirt portion 18a, which tends to lift this skirt portion 18a moderately. And, of course, if the obstacle is of a sufficient height so that the front skirt portion 18a actually comes in contact with the obstacle, the skirt 18 being made of a flexible material will simply be deflected as the vehicle travels over the obstacle.

Therefore, we claim:

1. A vehicle for travel over a ground surface, said vehicle comprising
   (a) a vehicle body having a frame portion and a perimetrical skirt portion which together with said frame portion defines a downwardly open plenum cavity which when pressurized by air causes said vehicle to lift from the ground surface in a hovering position with said skirt portion forming with the ground surface a perimetrical air escape passage.
   (b) a ground wheel member rotatably mounted to said vehicle for rotation about a transverse horizontal axis, and located generally at the center of gravity of said vehicle, said wheel member being mounted for vertical movement to a ground-engaging position with said vehicle being in said hovering position and upwardly to a retracted position,
   (c) a ground wheel member vertical control mechanism for selective operation to raise said ground wheel member to said retracted position and to lower the ground wheel member to said ground-engaging position,
   (d) a power transmission opeartively connected to said wheel member to drive said wheel member and thus cause said vehicle to travel over the ground surface when said wheel member is in the ground-engaging position,
   (e) a brake mechanism operatively connected to said wheel member for selective operation to brake said vehicle when the ground wheel member is in its ground-engaging position,
   (f) a clutch mechanism operatively connected to said wheel member and having a disengaged position and an engaged position in which power can be transmitted to said wheel member,
   (g) a fan apparatus arranged to move a pressurizing air stream into said plenum cavity to lift the vehicle from the ground surface to said hovering position and to move a propelling air stream generally horizontally to propel said vehicle,
   (h) said fan apparatus having aerodynamic steering means to direct said air stream in selected directions,
   (i) said aerodynamic steering means acting at a location spaced horizontally from the location of said wheel member, whereby with said wheel member in its ground-engaging position, said aerodynamic steering means can exert a turning moment about the location of said ground wheel member, and
   (j) power means to drive said wheel member and said fan apparatus.

2. The vehicle as recited in claim 1, wherein there is an overriding clutch operatively connected to said ground wheel member at an operative location between said clutch mechanism and said ground wheel member, whereby said ground wheel member is able to rotate freely at a speed greater than which it would be driven by said power means.

3. The apparatus as recited in claim 1, wherein there is:
   (a) a control stick mounted to said vehicle for swing motion about a generally transverse horizontal axis, and further mounted for rotation about a turning axis,
   (b) first linkage means operatively connected between said control stick and said ground wheel member vertical control mechanism in a manner that swing motion of said control stick actuates said vertical control mechanism to move said ground wheel member between its retracted position and its ground-engaging position, and
   (c) second linkage means operatively connected between said control stick and said aerodynamic steering means in a manner that rotation of said control stick about its turning axis operates said aerodynamic steering means.

4. The apparatus as recited in claim 3, wherein said ground wheel vertical control mechanism comprises a toggle linkage connected between said wheel member and said vehicle body, and said first linkage means is connected to said toggle linkage and to said control stick at a location spaced from said swing axis, whereby swing motion of said control stick acts to retract and extend said toggle linkage to, respectively, raise and lower said ground wheel.

5. The apparatus as recited in claim 4, wherein said power transmission comprises a gear box having a generally transverse horizontal drive shaft and a chain and sprocket drive connected between said shaft and said wheel so as to transmit power to said wheel, and there is a wheel bracing member journal mounted at a location generally concentric with said shaft and also journal mounted to a shaft on which said wheel member is mounted, whereby said wheel member is raised and lowered about a generally arcuate path, the radial center of which is generally concentric with said drive shaft.

6. The apparatus as recited in claim 4, wherein said power means comprises a motor having a drive shaft directly coupled to said fan apparatus, and further having drive means which acts through said clutch mechanism to transmit power to said wheel member, whereby said motor constantly transmits power to said fan apparatus, but transmits power to said ground wheel member selectively with the operation of said clutch mechanism.

7. The apparatus as recited in claim 6, wherein said clutch mechanism has a clutch control pedal having a clutch-engaging position and a clutch-disengaging position, and there is means to yieldingly urge said clutch pedal to its clutch disengaging position, whereby power is transmitted from said motor to said ground wheel member only when said clutch pedal is moved positively to its clutch-engaging position.

8. The apparatus as recited in claim 1, wherein said fan apparatus comprises a fan member mounted at the rear of said vehicle for rotary motion about a generally longitudinal axis to propel an air stream rearwardly from said vehicle, and there is a by-pass duct located behind said fan member to capture a portion of said air stream and direct that air stream portion into said plenum cavity, and wherein said perimetrical skirt portion comprises a downwardly extending, flexible skirt member defining a chamber extending around the perimeter of said vehicle, and there is an opening from said chamber to said plenum cavity, whereby a portion of the pressurized air directed into said plenum cavity flows into said chamber to pressurize the same to inflate said flexible material to a downwardly extending configuration.

9. The apparatus as recited in claim 8, wherein there are foot members mounted beneath said frame at locations forward of and behind said ground wheel member, whereby when action of said ground wheel in either accelerating or decelerating said vehicle causes an excessive forward or rear tipping moment on said vehicle, said foot members prevent any excessive tipping motion of the vehicle.

References Cited

UNITED STATES PATENTS

| | | | |
|---|---|---|---|
| 3,170,530 | 2/1965 | Black | 180—119 |
| 3,173,510 | 3/1965 | Smith | 180—119 |
| 3,246,712 | 4/1966 | Mackie | 180—119 |

A. HARRY LEVY, *Primary Examiner.*